United States Patent
Ogasahara (12)

(10) Patent No.: US 11,741,323 B2
(45) Date of Patent: Aug. 29, 2023

(54) PRINTING SUPPORT METHOD FOR ESTIMATING PERFORMANCE ACCORDING TO PREDETERMINED DERIVATION RULES

(71) Applicant: KYOCERA Document Solutions Inc., Osaka (JP)

(72) Inventor: Okito Ogasahara, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/811,286

(22) Filed: Jul. 7, 2022

(65) Prior Publication Data

US 2023/0012070 A1    Jan. 12, 2023

(30) Foreign Application Priority Data

Jul. 8, 2021    (JP) ................................. 2021-113333

(51) Int. Cl.
*G06K 15/02* (2006.01)
*G03G 15/00* (2006.01)

(52) U.S. Cl.
CPC ..... *G06K 15/1809* (2013.01); *G03G 15/5008* (2013.01); *G06K 15/1823* (2013.01)

(58) Field of Classification Search
CPC ........... G06K 15/1809; G06K 15/1823; G03G 15/5008
See application file for complete search history.

(56) References Cited

U.S. PATENT DOCUMENTS 5,574,527 A * 11/1996 Folkins .............. G03G 15/5033
399/9
2021/0129563 A1* 5/2021 Van Vliembergen ........................
G06F 3/1256

FOREIGN PATENT DOCUMENTS

JP    2016215591 A    12/2016

OTHER PUBLICATIONS

English Machine Translation of JP 2002-019240-A (Takeda, Published Jan. 23, 2002) (Year: 2002).*
English Machine Translation of JP 2001-134062-A (Nishio, Published May 18, 2001) (Year: 2001).*

* cited by examiner

*Primary Examiner* — Juan M Guillermety
(74) *Attorney, Agent, or Firm* — Alleman Hall Creasman & Tuttle LLP (57) ABSTRACT

A plurality of registration data includes control parameter data related to control of an image forming apparatus capable of executing a printing process. A processor, according to input designation information, selects target registration data from the plurality of registration data. Moreover, the processor derives estimated performance according to derivation rules. Furthermore, the processor outputs information about the estimated performance. The estimated performance is performance related to the printing process in a case where it is presumed that the printing process is executed according target parameters. The target parameters are the control parameters of the target registration data.

6 Claims, 6 Drawing Sheets

PRINTING SUPPORT METHOD FOR ESTIMATING PERFORMANCE ACCORDING TO PREDETERMINED DERIVATION RULES

INCORPORATION BY REFERENCE

This application is based upon and claims the benefit of priority from the corresponding Japanese Patent Application No. 2021-113333 filed on Jul. 8, 2021, the entire contents of which are incorporated herein by reference.

BACKGROUND

The present disclosure relates to a printing support method for an image forming apparatus capable of executing a printing process according to control parameters selected from among a plurality of candidates, and to an image forming apparatus.

An image forming apparatus has one or more paper storage portions, and by conveying a plurality of sheets of paper stored in the paper storage portions one sheet at a time along a conveying path, forms an image on the conveyed paper.

In addition, it is known in the art that an image forming apparatus specifies control parameters according to characteristics of the paper, and executes a printing process according to the specified control parameters. The printing process is a process of forming an image on the paper.

SUMMARY

The printing support method according to one aspect of the present disclosure includes a processor selecting target registration data. The processor, in a case where a plurality of registration data includes data of control parameters related to control of an image forming apparatus capable of executing a printing process, selects the target registration data from the plurality of registration data according to input designation information. Moreover, the printing support method includes the processor deriving an estimated performance according to predetermined derivation rules. Furthermore, the printing support method includes the processor outputting information of the estimated performance. The estimated performance is performance related to the printing process in a case where it is presumed that the printing process is executed by the image forming apparatus according target parameters. The target parameters are the control parameters of the target registration data.

The image forming apparatus according to another aspect of the present disclosure includes a processor configured to achieve the printing support method.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Embodiments according to the present disclosure will be described below with reference to the drawings. Note that the following embodiments are examples of implementing the technique according to the present disclosure and do not limit the technical scope of the present disclosure

[Configuration of Image Forming Apparatus 10]

An image forming apparatus 10 according to an embodiment is capable of executing a printing process of forming an image on paper 9.

Figure 1:
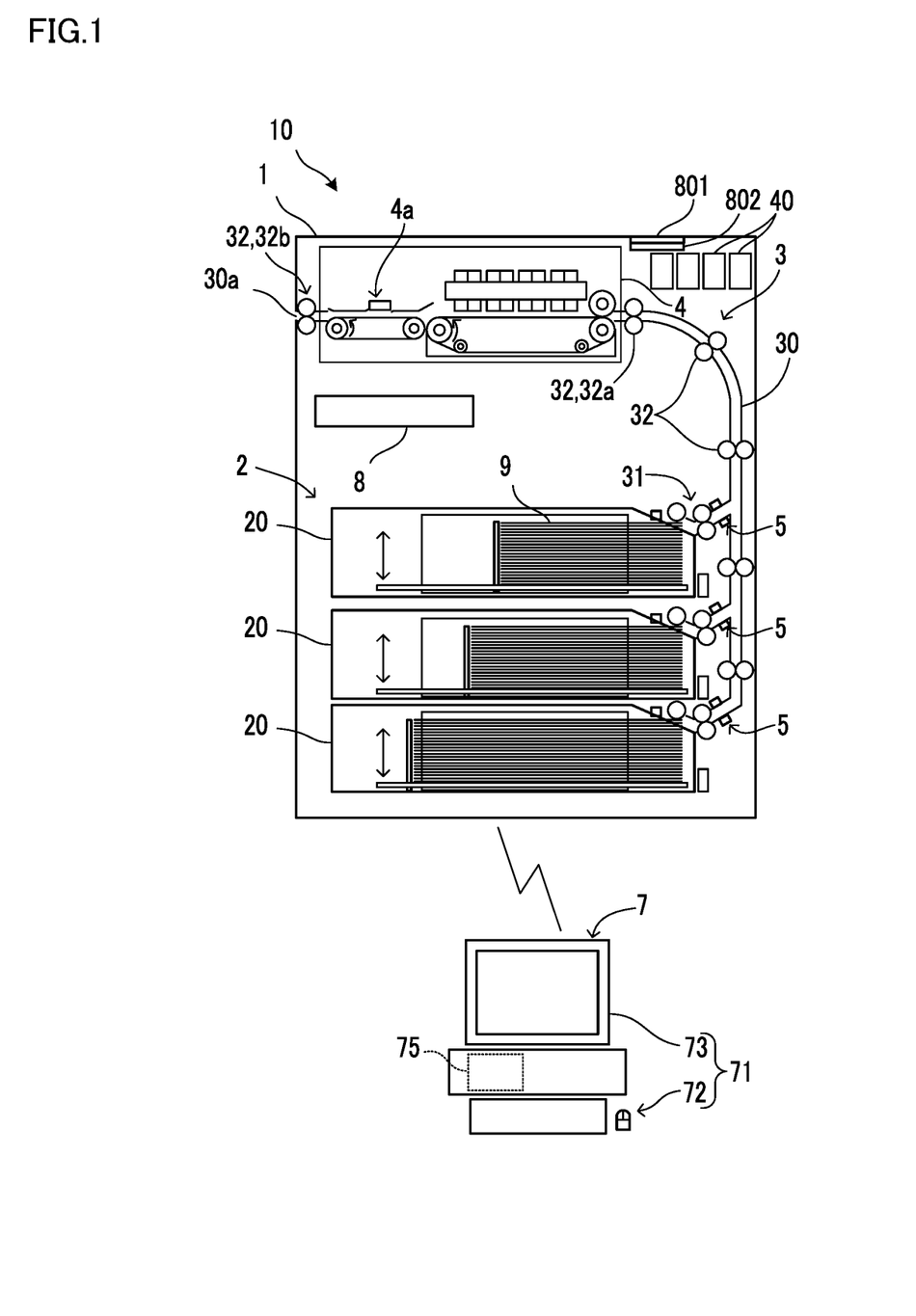
FIG. 1 is a configuration diagram of an image forming apparatus according to an embodiment

As illustrated in FIG. 1, the image forming apparatus 10 includes a main housing 1, a sheet feed portion 2 arranged inside the main housing 1, a paper conveying device 3, a printing device 4 and a control device 8.

The main housing 1 is a main portion of the image forming apparatus 10. The image forming apparatus 10 includes an operation device 801 and a display device 802. The paper conveying device 3 includes a paper supply device 31 and a plurality of sets of conveying roller pairs 32.

The sheet feed portion 2 includes one or more paper cassettes 20 capable of storing a plurality of sheets of paper 9. The paper cassette 20 is supported so as to be able to be pulled out from a predetermined mounting position in the main housing 1. The paper cassette 20 is an example of a paper storage portion. In the example illustrated in FIG. 1, the sheet feed portion 2 includes three paper cassettes 20.

The paper supply device 31 feeds paper 9 from inside the paper cassette 20 to the conveying path 30 one sheet at a time. The plurality of sets of conveying roller pairs 32 conveys the paper 9 fed by the paper supply device 31 along the conveying path 30. The plurality of conveying roller pairs 32 include a registration roller pair 32a and a discharge roller pair 32b.

The registration roller pair 32a pauses the paper 9 in the conveying path 30, and further feeds the paper 9 to a printing position in the conveying path 30. The discharge roller pair 32b discharges the paper 9 that is fed out from the printing device 4 and on which an image is formed to a discharge port 30a of the conveying path 30.

Note that a connecting unit (not illustrated) is connected to the image forming apparatus 10. The connecting unit receives and stores the paper 9 on which an image has been formed and that is discharged from the discharge port 30a of the conveying path 30.

The printing device 4 executes the printing process on the paper 9 conveyed by the paper conveying device 3. In the example illustrated in FIG. 1, the printing device 4 executes the printing process by an inkjet method.

The printing device 4 is supplied with ink from an ink unit 40 that is mounted in the main housing 1. The ink is an example of a developing agent. In addition, the ink unit 40 is an example of a developing agent unit that stores the developing agent.

Note that the printing device 4 may be a device that executes the printing process by electrophotography. In this case, toner is used as the developing agent. In addition, a toner unit that stores the toner is used as the developing agent unit.

In addition, the printing device 4 includes a drying device 4a that dries an ink image that is formed on the paper 9 (refer to FIG. 1).

The operation device 801 is a device that receives human operation, and includes, for example, operation buttons and a touch panel. The display device 802 is a device that displays information, and includes, for example, a panel display device such as a liquid-crystal display unit or the like.

The control device 8 executes control of various types of data processing and the image forming apparatus 10.

Figure 2:
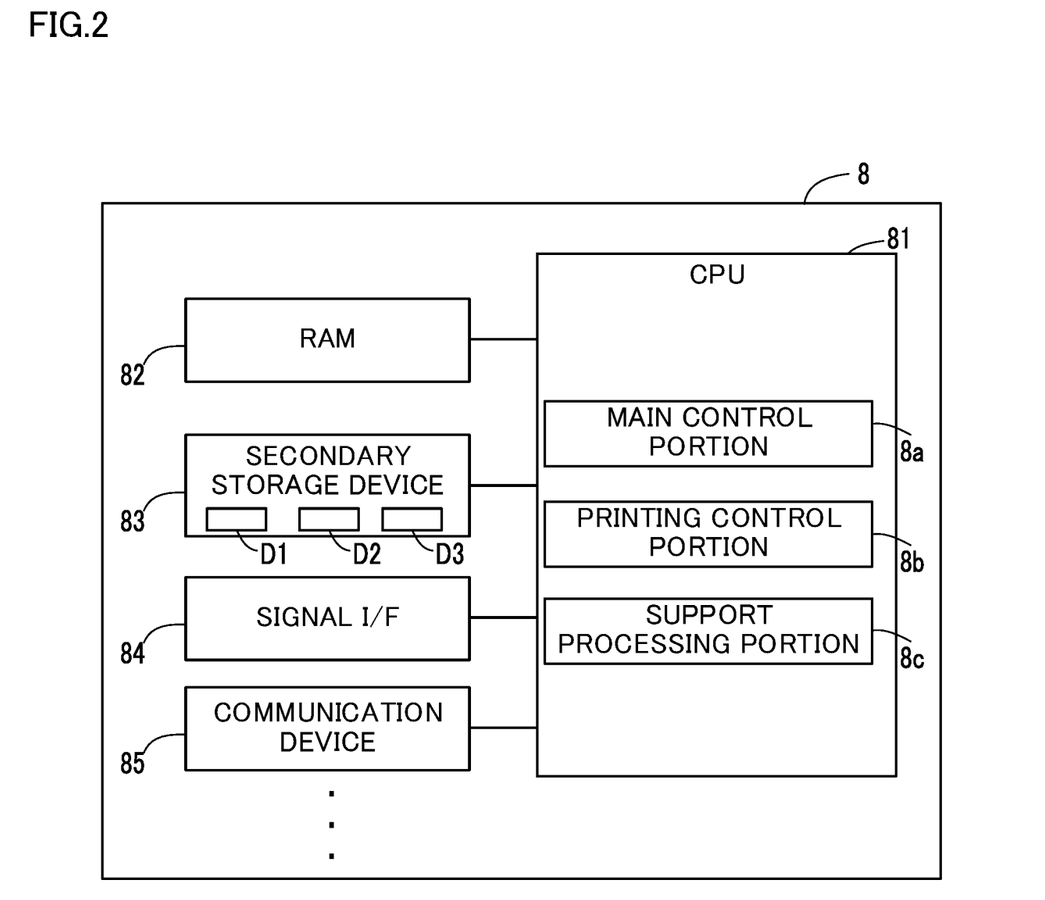
FIG. 2 is a block diagram illustrating a configuration of a control device in the image forming apparatus according to an embodiment.

As illustrated in FIG. 2, the control device 8 includes a central processing unit (CPU) 81, and peripheral devices such as a random access memory (RAM) 82, a secondary storage device 83, a signal interface 84, and the like.

Furthermore, the control device 8 also includes a host device 7 and a communication device 85 capable of communicating with other devices. The host device 7 is an information processing apparatus such as a personal computer, a smartphone or the like operated by a user.

The secondary storage device 83 is a computer-readable non-volatile storage device. The secondary storage device 83 is capable of storing and updating the computer program and various types of data. One or both of a flash memory or a hard disk drive can, for example, be used as the secondary storage device 83.

The signal interface 84 converts signals outputted by various types of sensors to digital data, and transfers the converted digital data to the CPU 81. Furthermore, the signal interface 84 converts control instructions outputted by the CPU 81 to control signals and transfers the control signals to devices to be controlled.

The communication device 85 executes communication with other devices such as the host device 7 and the like that send job data to the image forming apparatus 10. The CPU 81 communicates with the other devices via the communication device 85. The job data represents a request to execute a printing job. The printing job is the printing process according to information included in the job data. For example, the job data includes information such as the type of paper 9, the number of prints, and the like.

The CPU 81 is a processor that, by executing a computer program, executes various types of data processing and control. The RAM 82 is a computer-readable, volatile storage device. The RAM 82 primarily stores the computer program that is executed by the CPU 81, and data that the CPU 81 outputs and references in the process of executing various types of processing.

The CPU 81 includes a plurality of processing modules that are achieved by executing the computer program. The plurality of processing modules include a main control portion 8a and a printing control portion 8b.

The main control portion 8a executes control such as control that starts various types of processing according to operation of the operation device 801, control of the display device 802, and the like.

The printing control portion 8b, by controlling the paper conveying device 3, controls feeding of the paper 9 from the sheet feed portion 2 and conveying of the paper 9. Furthermore, the printing control portion 8b, in synchronization with conveying of the paper 9 by the paper conveying device 3, causes the printing device 4 to execute the printing process.

[Configuration of the Host Device 7]

As illustrated in FIG. 1, the host device 7 includes a human interface device 71 and a data processing device 75. The human interface device 71 includes an operation device 72 and a display device 73. For example, the display device 73 is a panel display, and the operation device 72 is a keyboard and a mouse.

Figure 3:
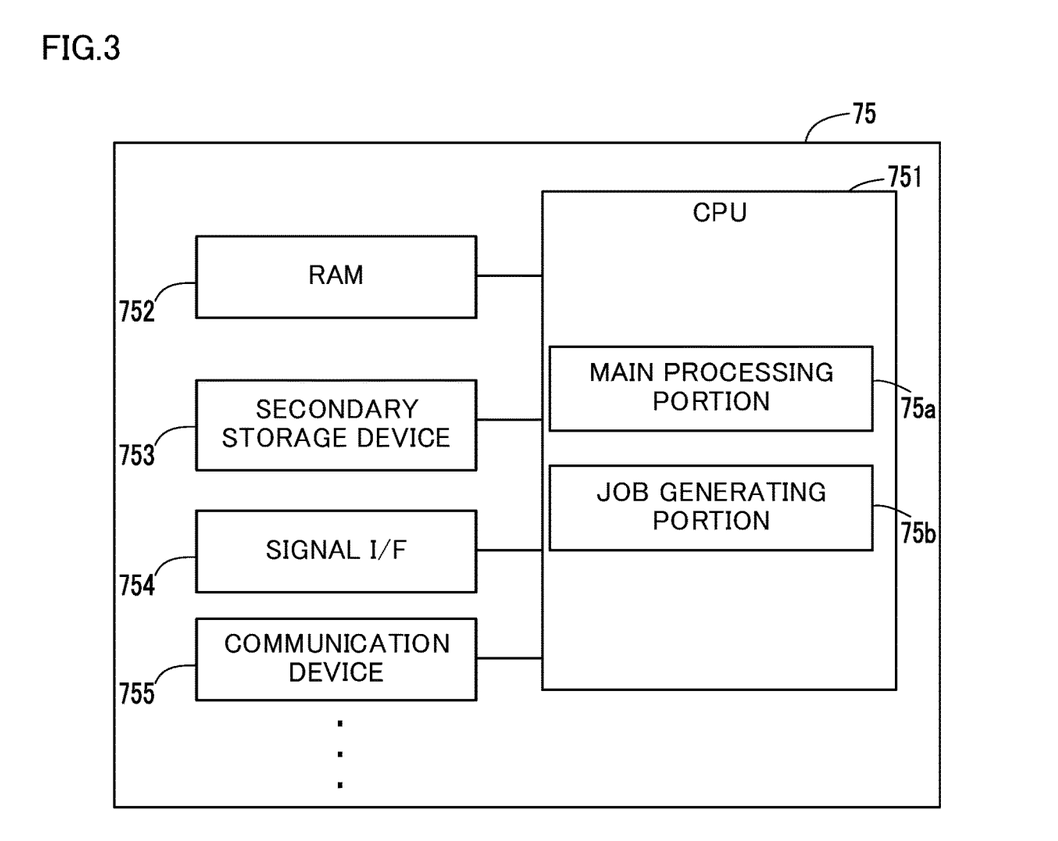
FIG. 3 is a block diagram illustrating a configuration of a data processing device in a host device.

As illustrated in FIG. 3, the data processing device 75, similar to the control device 8, includes a CPU 751, and peripheral devices such as RAM 752, a secondary storage device 753, a signal interface 754, and the like. Furthermore, the data processing device 75 also includes a communication device 755 capable of communicating with the communication device 85 of the image forming apparatus 10.

The CPU 751 includes a plurality of terminal processing modules that are achieved by executing a computer program. The plurality of terminal processing modules include a main processing portion 75a and a job generating portion 75b.

The main processing portion 75a executes control such as control that starts various types of processing according to operation of the operation device 72, control of the display device 73, and the like.

The job generating portion 75b generates the job data. Furthermore, the job generating portion 75b sends the generated job data to the image forming apparatus 10 via the communication device 755.

As will be described later, the image forming apparatus 10 includes a function of executing the printing process according to control parameters D22 corresponding to the characteristics of the paper 9 (refer to FIGS. 5 and 7).

In the image forming apparatus 10, the control parameters D22 used may have an effect on the performance of the printing process.

For example, the control parameters D22 may include a density correction parameter relating to the correction of the developing density. The density correction parameter affects the number of prints per one ink unit 40 that stores the ink.

In addition, the control parameters D22 may include a conveying interval parameter relating to the conveying interval of the paper 9. The conveying interval parameter affects the number of prints per unit time.

On the other hand, there is a need to accurately calculate printing productivity such as the time required or cost for executing a printing job before the printing job is executed. Generally, the printing productivity is calculated based on the standard performance of the image forming apparatus 10.

However, the control parameters D22 that are used may differ for each printing job. In this case, the device performance related to the printing speed or the consumed amount of the ink when the printing job is executed will differ for each printing job.

Therefore, in order to accurately calculate the printing productivity, it is necessary to estimate the device performance according to the control parameters D22 that are used.

In the image forming apparatus 10, the plurality of processing modules further includes a support processing portion 8c (refer to FIG. 2). The support processing portion 8c executes a printing support process that will be described later (refer to FIG. 8). Thus, the image forming apparatus 10 is able to estimate the device performance according to the control parameters D22 that are used.

[Configuration of Registration Data]

In the present embodiment, a plurality of pieces of paper registration data D1, a plurality of pieces of adjustment data D2, and a plurality of pieces of cassette data D3 are stored in the secondary storage device 83 (refer to FIG. 2). The plurality of pieces of paper registration data D1, the plurality of pieces of adjustment data D2, and the plurality of pieces of cassette data D3 are examples of a plurality of pieces of registration data.

The paper registration data D1 is data related to the paper 9 that can be used in the image forming apparatus 10. The adjustment data D2 is data related to control of the printing device 4 and the paper conveying device 3. The cassette data D3 is data related to the paper cassette 20.

Figure 4:
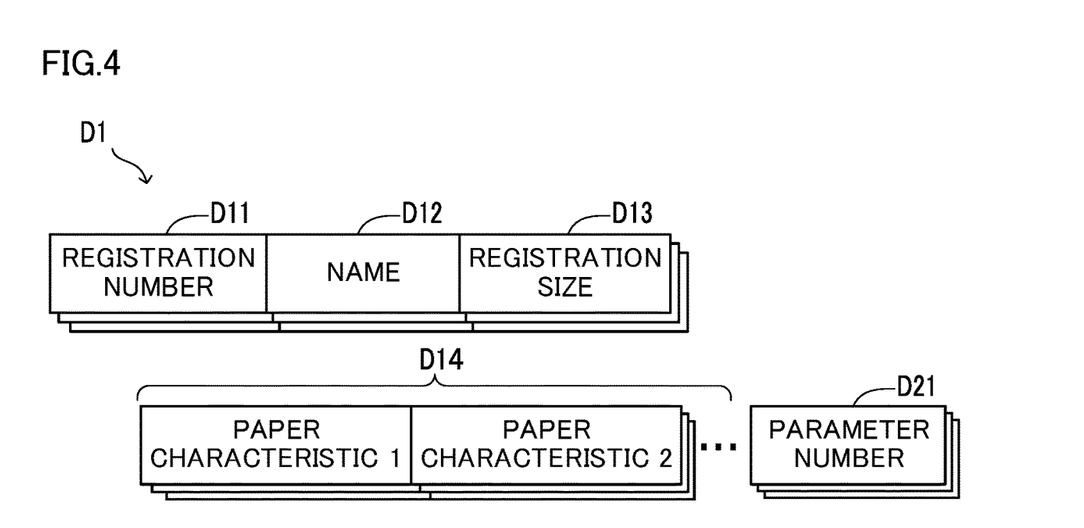
FIG. 4 illustrated an example of data configuration of paper registration data.

For example, as illustrated in FIG. 4, the paper registration data D1 includes a registration number D11, name data D12 correlated with the registration number D11, registration size data D13 and paper characteristics data D14.

The registration number D11 is information for identifying the type of paper 9. The paper characteristics data D14 includes information other than size related to the paper 9 corresponding to the registration number D11. For example, the paper characteristics data D14 includes information representing the characteristics of the paper 9, such as the material, thickness, and hardness of the paper 9.

Figure 5:
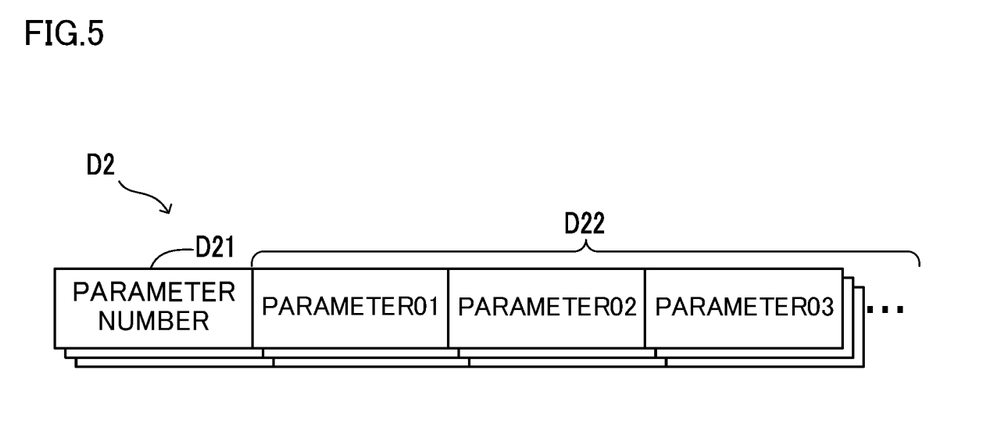
FIG. 5 illustrates an example of data configuration of printing adjustment data in an image forming apparatus of an embodiment.

As illustrated in FIG. 5, the adjustment data D2 includes a parameter number D21, and one or more control parameters D22 correlated with the parameter number D21. The parameter number D21 is information for identifying the control parameters D22.

The control parameters D22 are parameters related to control of the image forming apparatus 10 capable of executing the printing process. For example, the control parameters D22 include one or a plurality of a density correction parameter, a conveying interval parameter, a conveying speed parameter, a drying time parameter, and a maintenance parameter.

The density correction parameter is a parameter related to correcting the development density. The printing control portion 8b, according to the density correction parameter, controls the ink ejection amount corresponding to the density value for each pixel in the image data.

In order to form an image having suitable density on the paper 9, it may be necessary to correct the ink ejection amount by the printing device 4 according to the material of the paper 9. For example, the density correction parameter is set according to the material of the paper 9 that is registered as the paper characteristics data D14.

The conveying interval parameter is a parameter related to the conveying interval of the paper 9. The printing control portion 8b, according to the conveying interval parameter, controls the timing for feeding the paper 9 by the registration roller pair 32a. Thus, the conveying interval of the paper 9 is adjusted.

The material of the paper 9 or the hardness of the paper 9 may affect the susceptibility of the paper 9 to slip in the paper conveying device 3. In a case where the paper 9 is likely to slip, it is desirable that the paper 9 conveying interval be set large.

For example, the conveying interval parameter is set according to the material of the paper 9 or the hardness of the paper 9 registered as the paper characteristics data D14.

The conveying speed parameter is a parameter related to the conveying speed of the paper 9. The printing control portion 8b, according to the conveying speed parameter, controls the conveying speed of the paper 9 by the paper conveying device 3.

The material of the paper 9 or the hardness of the paper 9 may affect the susceptibility of the paper 9 to jam in the conveying path 30. On the other hand, by adjusting the conveying speed of the paper 9 to be slow, jamming of the paper 9 may be less likely to occur.

For example, the conveying speed parameter is set according to the material of the paper 9 or the hardness of the paper 9 registered as the paper characteristics data D14.

The drying time parameter is a control parameter D22 related to drying time of ink on the paper 9 by a drying device 4a. The drying time parameter is set according to the type of surface coating of the paper 9, the material of the paper 9, or the like registered as the paper characteristics data D14.

The maintenance parameter is a parameter related to the frequency of required maintenance and the time required for the maintenance of equipment related to the printing process.

For example, the maintenance parameter includes an auto maintenance parameter and a manual maintenance parameter.

The auto maintenance parameter is a parameter related to an auto maintenance process that is automatically executed by the image forming apparatus 10. For example, the auto maintenance parameter includes the frequency of executing a head cleaning process and time required for the head cleaning process. The head cleaning process is a process of cleaning the ink heads of the printing device 4.

The manual maintenance parameter is a parameter related to manual maintenance work of equipment of the image forming apparatus 10. For example, the manual maintenance parameter incudes the frequency of performing roller maintenance and the time required for the roller maintenance.

The roller maintenance is work of cleaning rollers such as the paper feed rollers of the paper supply device 31, or work of replacing the rollers.

In a case using paper 9 made of a material that easily produces paper dust, the nozzles of the ink heads are easily clogged, and the rollers deteriorate rapidly.

For example, the maintenance parameter is set according to the material or the like of the paper 9 that is registered as the paper characteristics data D14.

As illustrated in FIG. 4, the paper registration data D1 includes a parameter number D21 that is correlated with the registration number D11. Thus, the name data D12 in the paper registration data D1, and the paper characteristics data D14 in the registration size data D13 are correlated with the control parameter data D22 in the adjustment data D2.

One set of data that is correlated with one registration number D11 in the paper registration data D1, the adjustment data D2 and the cassette data D3 is one piece of the plurality of registration data. That is, each piece of registration data is correlated with a registration number D11 in each the paper registration data D1, the adjustment data D2, and the cassette data D3.

The registration size data D13 and paper characteristics data D14 are examples of paper information data related to the type of paper 9 on which an image is formed in the printing process described above.

Figure 6:
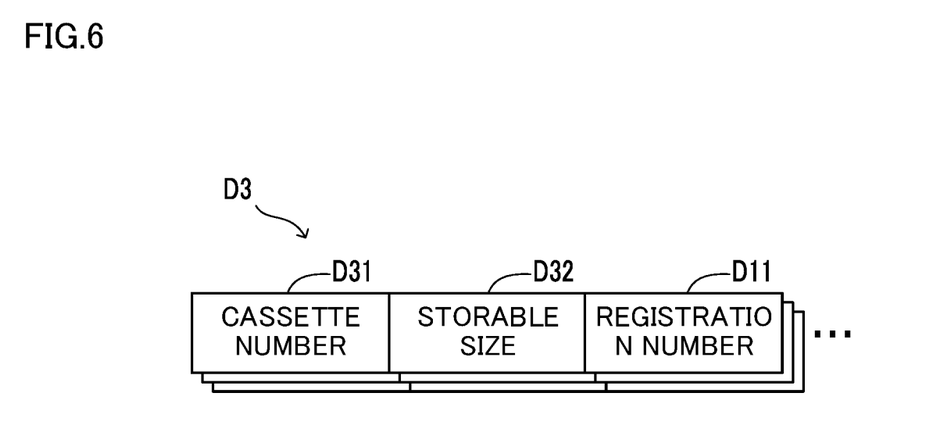
FIG. 6 illustrates an example of data configuration of cassette data in an image forming apparatus of an embodiment.

As illustrated in FIG. 6, the cassette data D3 includes a cassette number D31 and storable size data D32 that are correlated with each other. The cassette number D31 is data for identifying a paper cassette 20 mounted on the main housing 1.

The storable size data D32 represents the size of the paper 9 that can be stored in each paper cassette 20. The cassette data D3 includes a registration number D11 that is correlated with a cassette number D31. Thus, the paper cassette 20 and the paper registration data D1 that corresponds to the paper 9 that is stored in that paper cassette 20 are correlated.

In the present embodiment, the job generating portion 75b of the host device 7 is able to generate the job data that includes designated paper identification data that indicates the type of paper 9. The designated paper identification data is an example of paper designation information that can specify the registration size data D13 and the paper characteristics data D14. The designated paper identification data is also an example of designation information that is input to the CPU 81.

The designated paper identification data is information for specifying the type of paper 9 that is to be subjected to image formation when the printing job is executed. In the present embodiment, the designated paper identification data corresponds to the registration number D11 of the paper registration data D1.

That is, the paper 9 specified in the job data is the paper 9 specified by the same registration number D11 as the designated paper identification data.

[Pre-Job Process]

In the following, an example of a procedure for a pre-job process will be described with reference to the flowchart illustrated in FIG. 7. In the following description, S101, S102, represent identification codes for a plurality of steps in the pre-job process.

The printing control portion 8b starts the pre-job process after the job data is received from the host device 7. In the pre-job process, first the processing of step S101 is executed.

<Step S101>

In step S101, the printing control portion 8b selects target registration data from a plurality of pieces of adjustment data D2. Furthermore, the printing control portion 8b acquires the target registration data from the secondary storage device 83.

The target registration data is adjustment data D2 that corresponds to the registration number D11 that represents the same type of paper 9 as the designated paper identification data included in the received job data. After that, the printing control portion 8b advances the process to step S102.

<Step S102>

In step S102, the printing control portion 8b selects the next process. Candidates for the next process are the printing job, the printing support process, and cancel.

For example, the printing control portion 8b transmits the data of the selection screen for the next process to the host device 7 that is the transmission source of the job data, and selects the next process according to a response from the host device 7.

In addition, the printing control portion 8b may cause the display device 802 to display the selection screen, and select the next process according to an operation on the operation device 801.

The printing control portion 8b, in a case where the printing job is selected as the next process, advances the process to step S103. In addition, the printing control portion 8b, in a case where the printing support process is selected as the next process, advances the process to step 106.

On the other hand, the printing control portion 8b, in a case where cancel is selected as the next process, ends the pre-printing process. In this case, neither the printing job nor the printing support process is executed.

<Step S103>

In step S103, the printing control portion 8b, based on the target registration data and the cassette data D3, determines whether or not there is a designated cassette in the sheet feed portion 2. The designated cassette is a paper cassette 20 that stores paper 9 corresponding to the target registration data.

In a case where it is determined that the designated cassette is in the sheet feed portion 2, the printing control portion 8b advances the process to step S104. On the other hand, in a case where the designated cassette is not in the sheet feed portion 2, the printing control portion 8b advances the process to step S105.

<Step S104>

In step S104, the printing control portion 8b selects the designated cassette as the target cassette, and ends the job process. The target cassette is a paper cassette 20 that is a supply source of paper 9 when the printing job is executed.

<Step S105>

In step S105, the printing control portion unit 8b selects the target cassette according to a selection operation on the operation device 801. At that time, the printing control portion 8b causes the display device 802 to display information of the type of paper 9 represented by the designated paper identification data.

For example, the user mounts the paper cassette 20 storing the paper 9 represented by the designated paper identification data to the sheet feed portion 2. In this case, the operation of selecting the mounted paper cassette 20 as the target cassette is performed using the operation device 801.

After selecting the target cassette, the printing control portion 8b ends the pre-printing process.

After the processing of step S104 or step S105 has been executed, the printing control portion 8b executes the printing job. That is, after executing the processing of step S104 or step S105, the printing control portion 8b causes the printing device 4 to execute the printing process according to the job data. At that time, the printing control portion 8b causes the paper supply device 31 to execute a process of feeding the paper 9 from the target cassette.

In the following description, the control parameters D22 of the target registration data are referred to as target parameters. When the printing control portion 8b executes the printing job, the printing control portion 8b causes the image forming apparatus 10 to execute the printing process according to the target parameters.

In other words, the printing control portion 8b causes the image forming apparatus 10 to execute the printing process according to the control parameters D22 corresponding to the type of paper 9 stored in the target cassette.

<Step S106>

Figure 8:
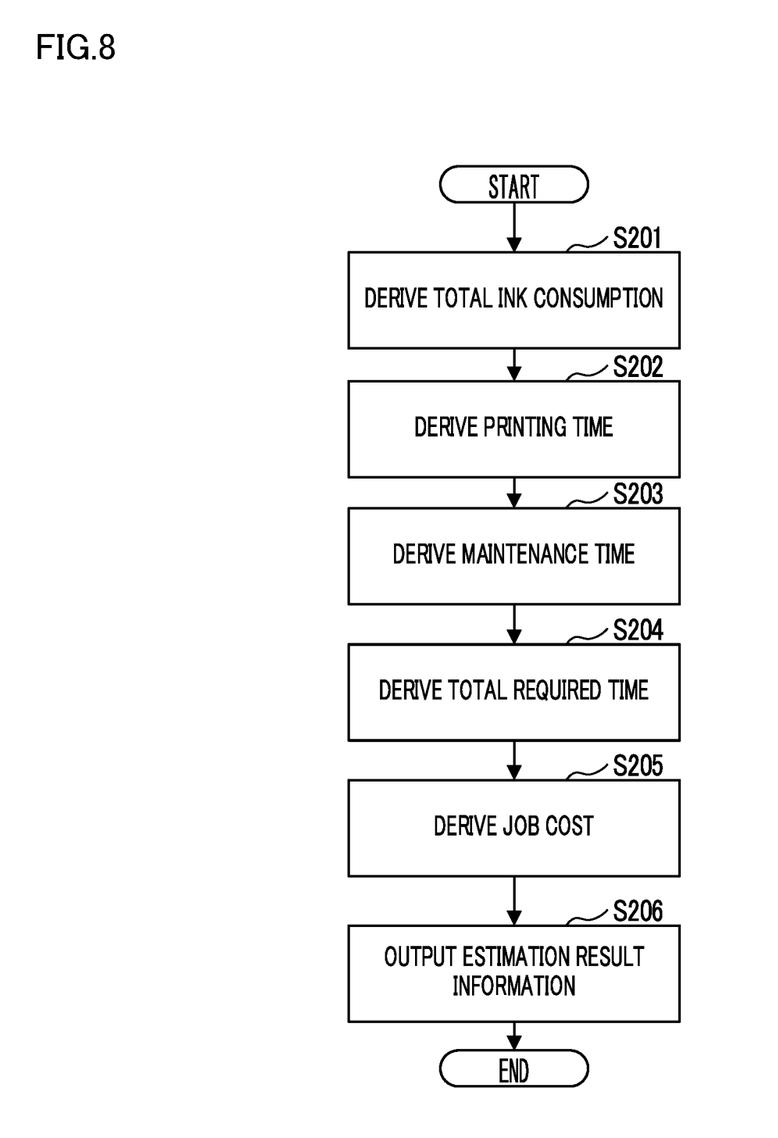
FIG. 8 is a flowchart illustrating an example of a procedure of a printing support process in an image forming apparatus of an embodiment.

In step S106, the support processing portion 8c executes the printing support process (refer to FIG. 8). The printing support process is executed using the target parameters. The printing support process will be described in detail later.

After the printing support process has been executed, the support processing portion 8c advances the process to step S107.

<Step S107>

In step S107, the support processing portion 8c selects either to re-execute the printing support process or not to re-execute the printing support process.

For example, the support processing portion 8c transmits the data of the selection screen of the necessity of re-execution to the host device 7, which is the transmission source of the job data, and executes selection for re-execution of the printing support process according to a response from the host device 7.

In addition, the support processing portion 8c may cause the display device 802 to display the selection screen, and execute selection for re-execution of the printing support process according to an operation using the operation device 801.

In a case where re-execution of the printing support process is selected, the support processing portion 8c advances the process to step S108. In addition, in a case where re-execution of the printing support process is not selected, the support processing portion 8c advances the process to step S102.

<Step S108>

In step S108, the support processing portion 8c executes a process of changing the designated paper, or in other words, a process of changing the designated paper identification data.

For example, the support processing portion 8c transmits data of a selection screen for the designated paper to the host device 7, which is the transmission source of the job data, and changes the designated paper identification data according to a reply from the host device 7.

In addition, the support processing portion 8c may cause the display device 802 to display the selection screen, and change the designated paper identification data according to an operation on the operation device 801.

After the designated paper identification data has been changed, the support processing portion 8c advances the process to step S109.

<Step S109>

In step S109, the support processing portion 8c selects the target registration data corresponding to the designated paper identification data changed in step S108 from among a plurality of adjustment data D2. Furthermore, the support processing portion 8c acquires the selected target registration data from the secondary storage device 83. After that, the support processing portion 8c advances the process to step S106.

The printing support process from the second time on is executed using the target parameters corresponding to the new target registration data acquired in step S109.

[Printing Support Process]

In the following, an example of a procedure for the printing support process will be described with reference to the flowchart illustrated in FIG. 8. The printing support process is an example of a process for achieving a printing support method for the image forming apparatus 10.

In the following description, S201, S202, . . . represent identification codes for a plurality of steps in the printing support process. In the printing support process, first the process of step S201 is executed.

<Step S201>

In step S201, in a case where it is presumed that the printing job is executed according to the target parameters, the support processing portion 8c derives the total ink consumption amount for executing the printing job.

More specifically, the support processing portion 8c derives a standard ink consumption amount according to a predetermined unit ink consumption amount and information of the number of prints included in the job data. The unit ink consumption amount is a standard ink consumption amount for forming an image on one sheet of paper 9.

Furthermore, the support processing portion 8c derives the total ink consumption amount by correcting the standard ink consumption amount according to the density correction parameter included in the target parameter.

After deriving the total ink consumption amount, the support processing portion 8c advances the process to step S202.

The total ink consumption amount derived in step S201 is an example of estimated performance related to the printing process. In addition, the total ink consumption amount is also an example of estimated performance with respect to the consumption amount of the developing agent. The above procedure for deriving the total ink consumption amount is an example of predetermined derivation rules.

<Step S202>

In step S202, the support processing portion 8c derives the printing time when it is presumed that the printing job is executed according to the target parameters. The printing time is the time required for the printing process in a case where the printing job is executed without maintenance in the middle of the process.

For example, the support processing portion 8c derives the unit required time according to the conveying interval parameter and the conveying speed parameter included in the target parameters. The unit required time is the time required to form an image on one sheet of paper 9.

Furthermore, the support processing portion 8c derives the printing time according to the unit required time and the information of the number of prints included in the job data.

After deriving the printing time, the support processing portion 8c advances the process to step S203.

The printing time derived in step S202 is an example of the estimated performance. In addition, the printing time is also an example of the estimated performance regarding the time required for executing the printing job. The above procedure for deriving the printing time is an example of predetermined derivation rules.

<Step S203>

In step S203, the support processing portion 8c derives the maintenance time when it is presumed that the printing job is executed according to the target parameters.

The maintenance time is the time required for the automatic maintenance and the manual maintenance in a case where it is presumed that the printing job is executed according to the target parameters.

More specifically, the support processing portion 8c derives the maintenance frequency according to the number of prints included in the job data and the maintenance frequency information included in the target parameters.

The maintenance frequency is the number times that each of the automatic maintenance and the manual maintenance occurs when the printing job is presumed to be executed according to the target parameters.

Furthermore, the support processing portion 8c derives the maintenance time according to the maintenance frequency and the information of the required time for maintenance included in the target parameters.

After deriving the maintenance time, the support processing portion 8c advances the process to step S204. The maintenance time derived in step S203 is an example of the estimated performance. The above procedure for deriving the maintenance time is an example of predetermined derivation rules.

<Step S204>

In step S204, the support processing portion 8c derives the total required time when it is presumed that the printing job is executed according to the target parameters.

The total required time is the total time of the printing time derived in step S202 and the maintenance time derived in step S203. After deriving the total required time, the support processing portion 8c advances the process to step S205.

The total required time derived in step S204 is an example of the estimated performance. In addition, the total required time is also an example of the estimated performance regarding the time required for executing the printing job. The above procedure for deriving the total required time is an example of predetermined derivation rules.

<Step S205>

In step S205, the support processing portion 8c, based on the total ink consumption amount and the total required time, derives a job cost, which is a cost for executing the printing job.

For example, the support processing portion 8c derives the ink cost according to a predetermined ink unit price and the total ink consumption amount. Moreover, the support processing portion 8c derives the time cost according to the predetermined time unit price and the total required time. Furthermore, the support processing portion 8c derives the sum of the ink cost and the time cost as the job cost.

After deriving the job cost, the support processing portion 8c advances the process to step S206.

<Step S206>

In step S206, the support processing portion 8c outputs a derivation result of steps S201 to S205, and estimation result information, which is the information of the details thereof.

For example, the support processing portion 8c outputs the estimation result information via an information output device. The information output device is one or both of the display device 73 of the host device 7 and the display device 802 of the image forming apparatus 10.

In addition, the support processing portion 8c may output the estimation result information to the secondary storage device 753 of the host device 7 or the secondary storage device 83 of the image forming apparatus 10.

In addition, the support processing portion 8c may output the estimation result information to the paper 9 by the printing process.

After the estimation result information has been output, the support processing portion 8c ends the printing support process.

Figure 7:
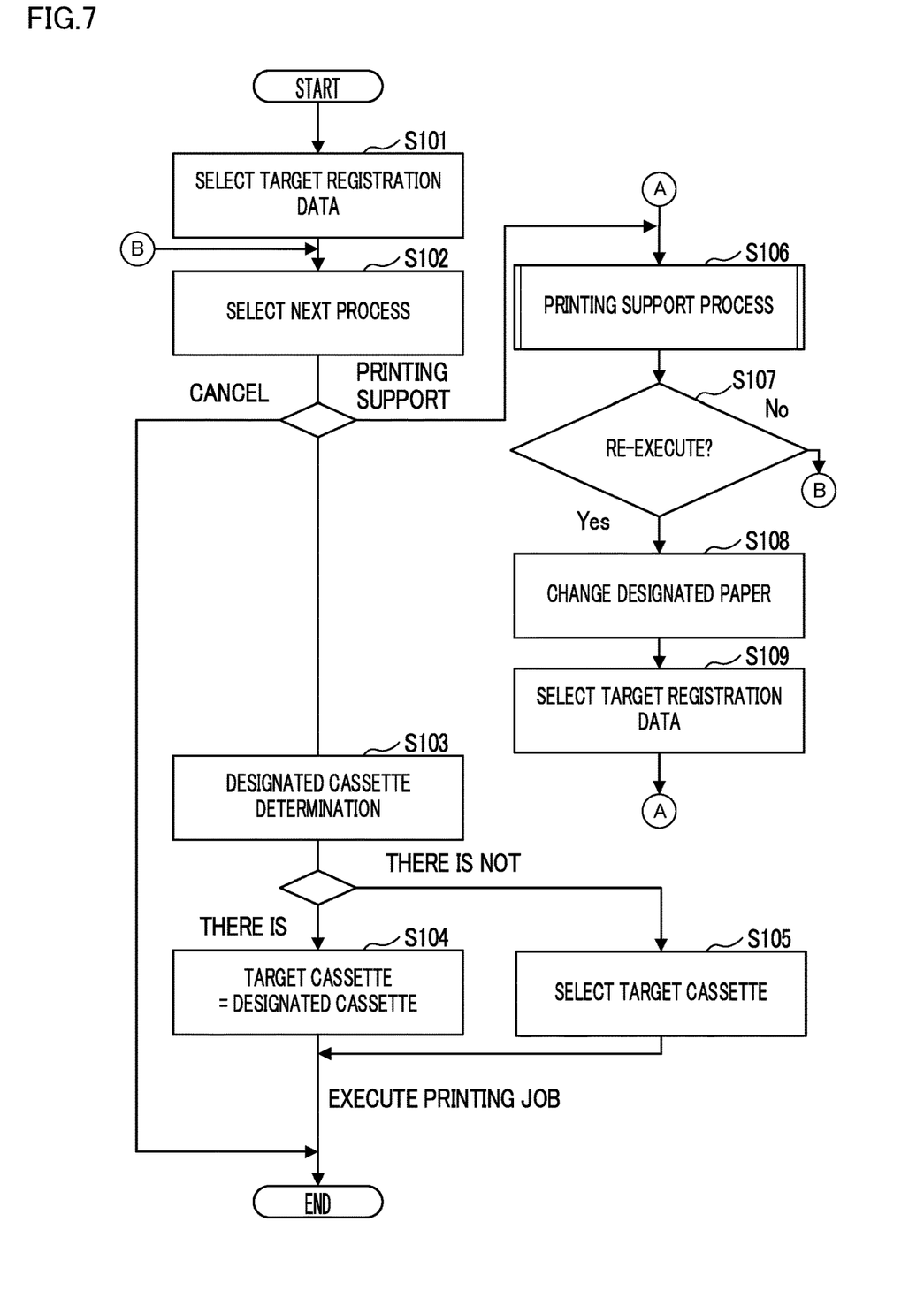
FIG. 7 is a flowchart illustrating an example of a procedure of a pre-job process in an image forming apparatus of an embodiment.

As described above, the printing control portion 8b or the support processing portion 8c selects the target registration data from a plurality of pieces of adjustment data D2 according to the inputted designation information (refer to step S101 and step S109 of FIG. 7).

In the present embodiment, the designated paper identification data included in the job data or the designated paper identification data set in step S108 is an example of the designation information. The designated paper identification data is also an example of paper specifying information that can specify the paper information.

In the present embodiment, the printing control portion 8b or the support processing portion 8c selects the target registration data in a case where the designated paper identification data capable of specifying the paper information is input as the designation information. As described above, the registration size data D13 and the paper characteristics data D14 are examples of the paper information data.

The printing control portion 8b or the support processing portion 8c selects the target registration data that includes the paper information corresponding to the designated paper identification data.

In addition, the support processing portion 8c derives the estimated performance in a case where it is presumed that the printing process by the image forming apparatus 10 is executed according to the target parameters. At that time, the support processing portion 8c derives the estimated performance according to a predetermined derivation rules (refer to steps S201 to S204 in FIG. 8).

The total ink consumption amount, the printing time, the maintenance time, and the total required time are examples of estimated performance. The estimated performance is performance related to the printing process.

Furthermore, the support processing portion 8c outputs estimated performance information (refer to step S206 in FIG. 8).

By adopting this embodiment, the estimated performance according to the adopted control parameters D22 is derived. As a result, it is possible to accurately calculate the printing productivity such as the time required or the cost for executing the printing job before the printing job is executed.

First Application Example

In the following, a first application example of the image forming apparatus 10 will be described.

In the embodiment described above, the support processing portion 8c derives the estimated performance in a case where it is presumed that the printing job is executed according to the target parameters.

On the other hand, in the present application example, the support processing portion 8c derives the ratio of specific performance to a predetermined standard performance as the estimated performance. The specific performance is performance in a case where it is presumed that the printing process is executed according to the target parameters.

For example, the support processing portion 8c derives the ratio of a specific ink consumption amount to a standard ink consumption amount when the printing process for one sheet of paper 9 is executed as the estimated performance.

The standard ink consumption amount is a predetermined amount. The specific ink consumption amount is the amount of ink consumed per sheet of paper 9 in a case where it is presumed that the printing process is executed according to the target parameters.

Similarly, the support processing portion 8c may derive the ratio of a specific required time to a standard required time when the printing process is executed on one sheet of paper 9 as the estimated performance.

The standard required time is a predetermined time. The specific required time is a required time for the printing process per one sheet of paper 9 in a case where it is presumed that the printing process is executed according to the target parameters.

In a case of adopting the present application example as well, the same effect as when the embodiment described above is used is obtained.

Second Application Example

In the following, a second application example of the image forming apparatus 10 will be described.

In the present application example, the control parameters D22 include a sensor adjustment parameter. The sensor adjustment parameter is a parameter relating to the adjustment value of the sensor included in the image forming apparatus 10 and the allowable range of the adjustment value.

More specifically, the image forming apparatus 10 includes a double feed sensor 5 (refer to FIG. 1). The double feed sensor 5 detects double feeding of paper. The double feeding of paper means that two or more sheets of overlapping paper 9 are fed from the paper cassette 20 of the sheet feed portion 2 to the conveying path 30.

For example, the double feed sensor 5 is an ultrasonic sensor that detects the attenuation of ultrasonic waves passing through the paper 9. When double feeding of paper occurs, the ultrasonic waves are attenuated when exceeding a predetermined limit.

In the present application example, the sensor adjustment parameter includes a set attenuation factor as an adjustment value of the double feed sensor 5, and a range of allowable attenuation factors. The range of allowable attenuation factors is the allowable range of the set attenuation factor.

The printing control portion 8b determines that double feeding of paper 9 has occurred in a case where the attenuation factor of an ultrasonic wave detected by the double feed sensor 5 exceeds the set attenuation factor while the paper supply device 31 is executing the paper feeding operation.

When it is determined that double feeding of the paper has occurred, the printing control portion 8b stops the operation of the paper supply device 31 and causes the display device 802 to display an error message.

The main control portion 8a is able to set the set attenuation factor according to a setting operation on the operation device 801. The main control portion 8a is able to set the set attenuation factor within the range of allowable attenuation factors. The main control portion 8a is able to set the set attenuation factor for each type of paper 9. The main control portion 8a records the set attenuation factor as the sensor adjustment parameter in the secondary storage device 83.

When the set attenuation factor is set according to the setting operation, the main control portion 8a derives a margin of the set attenuation factor with respect to the range of allowable attenuation factors, and outputs information related to the margin. The margin is an index value indicating to what extent the set attenuation factor is separated from the upper limit or the lower limit of the range of allowable attenuation factors.

For example, the main control portion 8a outputs information related to the margin of the set attenuation factor via the display device 802.

Furthermore, the main control portion 8a can set skip information corresponding to the double feed sensor 5 or cancel the skip information setting according to an operation using the operation device 801. The skip information is information that specifies that the printing control portion 8b does not execute a predetermined sensor compatible process based on the detection value of the double feed sensor 5 and the set attenuation factor.

The sensor compatible process for the double feed sensor 5 is a process of stopping the operation of the paper supply device 31 and displaying an error message on the display device 802 when it is determined that double feeding of paper has occurred.

The main control portion 8a can set the skip information for each type of paper 9 as a part of the control parameters D22 in the adjustment data D2.

When the printing process is executed, the printing control portion 8b executes the sensor compatible process in a case where the skip information setting is canceled. On the other hand, when the printing process is executed, the printing control portion 8b does not execute the sensor compatible process in a case where the skip information is set.

In a case where the margin of the set attenuation factor is small, there is a high possibility that the determination of double feeding of paper based on the detection result of the double feed sensor 5 will be an erroneous determination. When an erroneous determination of double feeding of paper occurs frequently, the productivity of the printing process is lowered.

By adopting the present application example, the skip information can be set in a case where the target parameters are parameters corresponding to paper 9 which is not suitable for the sensor compatible process for the double feed sensor 5. As a result, a decrease in the productivity of the printing process due to the erroneous determination of double feeding of paper is avoided.

Third Application Example

A part or all of the printing support process executed by the CPU 81 of the image forming apparatus 10 may be executed by a CPU 751 of the host device 7.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A printing support method, wherein
a plurality of registration data are stored in a non-volatile storage device,
each piece of the plurality of registration data includes paper information data related to a type of paper on which an image is formed in a printing process and control parameters related to control of an image forming apparatus capable of executing the printing process,
when the control parameters include a density correction parameter related to correction of a developing density, a conveying interval parameter related to a conveying interval of the paper, and a conveying speed parameter related to a conveying speed of the paper, and
the printing support method comprises:
a processor receiving a job data including information on a number of prints and paper designation information capable of specifying the paper information;
the processor selecting, from the plurality of registration data, target registration data corresponding to the paper designation information included in the job data;
the processor deriving estimated performance related to a time required for the printing process and a consumption amount of a developing agent in a case where it is presumed that the printing process for the number of prints is executed by the image forming apparatus according to the control parameters of the target registration data;
the processor outputting information regarding the estimated performance to the information processing apparatus;
the processor changing the paper designation information in accordance with an instruction from the information processing apparatus;

the processor re-executing, based on the changed paper designation information, the selection of the target registration data, the deriving of the estimated performance, and the output of the information regarding the estimated performance to the information processing apparatus; and the processor causing the image forming apparatus to execute the printing process according to the changed paper designation information and the control parameters corresponding to the changed paper designation information.

2. The printing support method according to claim 1, further comprising:

the processor deriving, as the estimated performance, a job cost that is a cost of the printing process in accordance with the required time and the consumption amount of the developing agent derived as the estimated performance, a unit price of the developing agent, and a time unit price.

3. The printing support method according to claim 1, wherein the control parameters further include a maintenance parameter related to a frequency of required maintenance and a time required for maintenance of equipment related to the printing process.

4. The printing support method according to claim 1, wherein the processor, as the estimated performance, derives the ratio of the performance in a case where it is presumed that the printing process is executed according to the target parameters with respect to a predetermined standard performance.

5. The printing support method according to claim 1, wherein the image forming apparatus includes a double feed sensor which is an ultrasonic sensor configured to detect attenuation of an ultrasonic wave passing through the paper fed from a sheet feed portion, the printing support method further comprises:

in a case where the control parameters include a sensor adjustment parameter related to an adjustment value of the double feed sensor and an allowable range of the adjustment value, the processor outputting information related to a margin of the adjustment value with respect to the allowable range in the sensor adjustment parameter;

the processor setting skip information or cancelling a skip information setting according to an operation using an operation device; and the processor, when the printing process is executed, executing a predetermined sensor compatible process in a case where the skip information setting is cancelled, and not executing the sensor compatible process in a case where the skip information is set;

the sensor compatible process is a process of stopping the feed of the paper in accordance with a result of comparison between a detected value of the double feed sensor and the adjustment value; and the skip information is information specifying not to execute the sensor compatible process.

6. An image forming apparatus comprising a processor that achieves the printing support method according to claim 1.

* * * * *